United States Patent
Okamura

[11] Patent Number: 6,023,756
[45] Date of Patent: *Feb. 8, 2000

[54] INSTRUCTION PROCESSING METHOD AND SYSTEM FOR VARIABLE-LENGTH INSTRUCTIONS

[75] Inventor: Atsushi Okamura, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/846,419

[22] Filed: Apr. 30, 1997

[30] Foreign Application Priority Data

Apr. 30, 1996 [JP] Japan ................................. 8-108814

[51] Int. Cl.[7] ...................................................... G06F 9/30
[52] U.S. Cl. ............................................................ 712/208
[58] Field of Search ..................................... 712/204, 205, 712/208, 215, 216, 245

[56] References Cited

U.S. PATENT DOCUMENTS

| | | | |
|---|---|---|---|
| 4,903,196 | 2/1990 | Pomerene et al. | 395/393 |
| 4,991,090 | 2/1991 | Emma et al. | 364/200 |
| 5,303,356 | 4/1994 | Vassiliadis et al. | 395/585 |
| 5,644,744 | 7/1997 | Mahin et al. | 395/383 |
| 5,680,637 | 10/1997 | Hotta et al. | |
| 5,805,470 | 10/1996 | Averill | 364/578 |

FOREIGN PATENT DOCUMENTS

| | | |
|---|---|---|
| 2-130635 | 5/1990 | Japan . |
| 5-257687 | 10/1993 | Japan . |

OTHER PUBLICATIONS

Patterson, David A. and Hennessy, John L. *Computer Architecture A Quantitative Approach*, Second Edition, Morgan Kaufmann Publishers, Inc., 1996, pp. 278–289, 308–317 and 334–339.

Johnson, Mike. *Superscalar Microprocessor Design*, Prentice–Hall, Inc., 1994, pp. 24–27, 108–111, 166–169, 234–243 and 256–261.

*Primary Examiner*—David Y. Eng
*Attorney, Agent, or Firm*—Scully, Scott, Murphy & Presser

[57] ABSTRACT

In an instruction processing system having a variable length instruction set, an instruction set which can no longer divided in an instruction set level architecture of a data processing system, is defined as an "elementary instruction set", and a combination of some number of elementary instruction sets is defined as a "parallel instruction set". When an instruction string fetched in an instruction fetch mechanism matches with one of some number of predetermined parallel instruction sets, instructions included in the parallel instruction set are issued or supplied to corresponding processing units, simultaneously in parallel. If the instruction string fetched in the instruction fetch mechanism matches with non of the predetermined parallel instruction sets, the instructions fetched in the instruction fetch mechanism are individually executed in the order for each elementary instruction set.

17 Claims, 8 Drawing Sheets

FIGURE 5

1-BYTE INSTRUCTION: | INTEGER ARITHMETIC OPERATION INSTRUCTION | REGISTER INDIRECT BRANCH INSTRUCTION |

2-BYTE INSTRUCTION: | INTEGER ARITHMETIC OPERATION INSTRUCTION | FLOATING-POINT ARITHMETIC OPERATION INSTRUCTION | LOAD / STORE INSTRUCTION |

3-BYTE INSTRUCTION: | INTEGER ARITHMETIC OPERATION INSTRUCTION | BRANCH INSTRUCTION |

4-BYTE INSTRUCTION: | INTEGER ARITHMETIC OPERATION INSTRUCTION | BRANCH INSTRUCTION | LOAD / STORE INSTRUCTION | SPECIAL INSTRUCTION |

INSTRUCTION PROCESSING METHOD AND SYSTEM FOR VARIABLE-LENGTH INSTRUCTIONS

BACKGROUND OF THE INVENTION

1. Field of the Invention

The present invention relates to an instruction processing method and system, and more specifically to an instruction processing method and system capable of increasing the number of instructions which can be simultaneously supplied in a processing unit having a variable length instruction set.

2. Description of Related Art

In general, as technique for elevating the performance of a processing unit, a VLIW (very long instruction word) system and a superscalar system are known. These systems involve a technology for executing instructions in parallel so as to increase the number of instructions which can be executed per one clock, thereby to realize a high performance. For example, in the VLIW system, it is deemed that an instruction given to an ordinary processing unit is called a "small instruction", and a group of instructions obtained by linking a predetermined numbs of "small instructions" under a constant limit, is called a "large instruction". The large instruction is read at one time, and the small instructions included in the large instruction are processed in parallel. The semantics of the VLIW system is that the small instructions included in the same large instruction are processed simultaneously.

Referring to FIG. 1, an example of the format of the VLIW instruction is shown. In the example shown in FIG. 1, instructions of 32 bytes are simultaneously read and executed as one instruction 407. Therefore, the instructions of 32 bytes corresponds to the large instruction, which is divided into some number of small instructions, each of which has an inherent instruction format. In the shown example, the large instruction is divided into six small instructions. In the order counted from a left, the six small instructions include a load/store (L/S) instruction 401, a load/store (L/S) instruction 402, an ALU instruction 403, an ALU instruction 404, an immediate (IMM) instruction 405 and a branch instruction 406. It is guaranteed that these six instructions are simultaneously executed. Here, the load/store instruction is to transfer data from a memory to internal general registers of a processing unit. The ALU instruction is to execute an arithmetic and logic operation between the internal general registers mentioned above. The IMM instruction is to set an operand value to the general register. The branch instruction is to change an address of an instruction to be executed next.

In this VLIW system, an arrangement of instructions and the field length of the small instructions are inherent to each processing unit, a compatibility is very low. Namely, since the large instruction is read and processed at one time, a string of small instructions must be arranged in the order of enabling that all the small instructions included in each one large instruction can be simultaneously executed unconditionally. If the small instructions cannot be simultaneously executed because of a dependence relation between the small instructions, a no-operation instruction is inserted to compensate for the dependence relation between the small instructions which are included in the large instruction and which are simultaneously executed. As mentioned above, the VLIW system is characterized in that instruction codes are arranged to be executed in parallel. This is called a static scheduling.

On the other hand, the superscalar system is a technique for making it possible to execute instructions in parallel, while ensuring compatibility with the conventional processing unit. In the conventional processing unit, instruction codes are regularly arranged to the effect that instructions are sequentially executed, one by one, in the order from an instruction having an small address. Therefore, after execution of a preceding instruction has been executed, it starts to execute a next instruction. There is a case that the result of execution of a preceding instruction is utilized in a succeeding instruction. This use of the result of execution of a preceding instruction is the "dependence relation" mentioned above. However, all the instructions has the above mentioned dependence relation, and even if an instruction having no dependence relation is executed early, no problem occurs.

In the VLIW system as mentioned above, instructions having no dependence relation are arranged in each one large instruction at the time of compiling, for the purpose of realizing the parallel processing. In the superscalar system, on the other hand, a string of instructions are fetched and analyzed in the order to be executed (program order), and instructions having no dependence relation are selected and picked up, and the instructions which can be processed early or in advance, are executed beforehand for the purpose of realizing the parallel processing. This parallel instruction processing system can be exemplified by a system for simultaneously processing a plurality of instructions, which is disclosed by Japanese Patent Application Pre-examination Publication No. JP-A-2-130635. In this disclosed system, a plurality of instructions are simultaneously read out, and the read-out instruction are analyzed by a plurality of decoders, so that only the decoded instructions have no dependence relation, the decoded instructions are executed in parallel by a plurality of processing means.

Referring to FIG. 2, there is shown a block diagram illustrating one example of the superscalar system which is one step ahead of the above mentioned example. This example is used in the IBM 360/91 machine available from International Business Machines Corporation.

A fetch unit 501 fetches and decodes an instruction supplied from a memory (not shown). On the basis of the decode result, the instructions are divided into different kinds of processing units corresponding to different kinds of instructions, and if an empty buffer exists in reservation stations 504 and 508, the fetch unit 501 supplies the corresponding instruction through a bus 507 to the reservation stations 504 and 508. In addition, if a source operand exists in the register file 502, the source operand is stored in the reservation stations 504 and 508. On the other hand, if there is no empty buffer in the reservation stations 504 and 508, the fetch unit 501 supplies no instruction, and stops the supplying of the instructions until an empty buffer occurs in the reservation stations 504 and 508.

For each of the instructions supplied into the reservation stations, if all necessary source operands are not completed, a common data bus is monitored, and if the necessary source operand appears on the common data bus 506, the value of the necessary source operand is written through a source register bus 503 to the reservation stations 504 and 508.

The instruction stored in each of the reservation stations 504 and 508 is supplied to the corresponding processing unit 505 or 509 when all necessary source operands have been completed. When each of the corresponding processing units 505 and 509 has completed execution of the received instruction, the processing unit writes the result of the execution through the common data bus 506 to the register file 502, and simultaneously to supply the same result to the reservation station which may wait for the result of the execution.

The above mentioned mechanism can realize the function to the effect that, if all necessary source operands have not yet been completed, namely, while the operands are not effective, the execution of the instruction is delayed in the reservation station, with the result that the instructions are preferentially executed in the executable order.

On the other hand, in the prior art CISC (complex instruction set computer) type instruction set, a variable length instruction set is used in order to shorten a static size of an instruction code. This variable length instruction set is an instruction set having an instruction format of a word length which is variable dependently upon an instruction. Therefore, if instructions are formatted to the effect that an instruction having a high occurrence frequency is short in length and an instruction having a low occurrence frequency is long in length, it is possible to shorten a static code size of a program. Now, explanation will be described about a procedure for decode a plurality of instruction codes included in the variable length instruction set, in order to execute, in parallel, the plurality of instruction codes included in the variable length instruction set. In the case of realizing an instruction set of a variable length instruction in the superscalar system, difficulty is attributable to an instruction fetch mechanism. In the superscalar system, the larger the number of instructions which can be supplied to execution units at one time becomes, the larger the possibility of parallel execution becomes. However, in the case of an architecture having the variable length instruction set, an instruction analyzing procedure becomes complex when a plurality of instructions are fetched.

In the present RISC (reduced instruction set computer) type instruction set, the instruction has a length of 32 bits and aligned with 4 bytes. Therefore, a starting position of each instruction is perfectly fixed, a parallel analysis of a plurality of instructions becomes possible by starting the instruction analysis from the fixed starting position. In the case of the variable length instruction, on the other hand, the position of a first instruction is definitely known, however, in order to find out a starting position of a second instruction, it is necessary to analyze the first instruction to know the size of the first instruction. In other words, in the variable length instruction, since the starting position of second and succeeding instructions is indefinite, it is necessary to decode the instructions in the order of execution, Therefore, the larger the number of instructions to be analyzed becomes, the larger the number of cascaded logic stages for finding out the start of the instructions becomes, with the result that a delay time increases. Accordingly, when the system is operated with a fast clock, it becomes difficult to decode many instructions.

Actually, when the system is operated with a high speed, if the instructions are decoded sequentially, the number of instructions which can be decoded with one clock, is greatly restricted. In order to speed up this instruction decoding, there is known a method for previously clarifying the partitions or boundaries by predecoding the instructions when the instructions are written into a cache. This method was adopted in a microprocessor available from Advanced Micro Devices, Inc. under the tradename "K5". In the K5 microprocessor, when an instruction is fetched from a memory and written into a on-chip cache, the instruction is decoded, and a byte corresponding to a header of the instruction is marked. This method is very excellent, but a predecode bit must be added to the cache, and in addition, since coincidence between a line of the cache and a branch destination address is not necessarily aligned, when the branch occurs, a control becomes very difficult.

In brief, in order to execute instructions in parallel in the superscalar system, it is necessary to decode a plurality of instructions during one clock. In the conventional RISC processor, since the instruction code is set to a fixed length of 32 bits and aligned with 4 bytes, it is possible to fetch a plurality of instructions at one time and to simultaneously decode the plurality of instructions. However, in the operation processing system for processing a variable length instruction set, even if many instructions are fetched at one time, since the starting position of respective instructions other than the first instruction varies dependently upon the kinds of preceding instructions, it is not possible to decode the many fetched instructions in parallel, and therefore, it is necessary to decode the fetched instructions, one by one, in their order. As a result, it is difficult to decode at a high speed many instructions which are to be simultaneously executed.

SUMMARY OF THE INVENTION

Accordingly, it is an object of the present invention to provide an instruction processing method and system which have overcome the above mentioned defects of the conventional processing unit having the variable length instruction set.

Another object of the present invention is to provide an instruction processing method and system capable of increasing the number of instructions which can be simultaneously supplied in a processing unit having a variable length instruction set.

The above and other objects of the present invention are achieved in accordance with the present invention by an improvement wherein an instruction set which can no longer be divided in an instruction set level architecture of a data processing system, is defined as an "elementary instruction set", and a combination of some number of elementary instruction sets is defined as a "parallel instruction set", and wherein when an instruction string fetched in an instruction fetch mechanism matches with one of some number of predetermined parallel instruction sets, instructions included in the parallel instruction set are issued to and processed by corresponding processing units, simultaneously in parallel, and if the instruction string fetched in the instruction fetch mechanism matches with none of the predetermined parallel instruction sets, the instructions fetched in the instruction fetch mechanism are individually executed in the order for each elementary instruction set.

The above and other objects, features and advantages of the present invention will be apparent from the following description of preferred embodiments of the invention with reference to the accompanying drawings.

BRIEF DESCRIPTION OF THE DRAWINGS

FIG. 5 illustrates the byte number of various elementary instructions;

DESCRIPTION OF THE PREFERRED EMBODIMENTS

Figure 1:
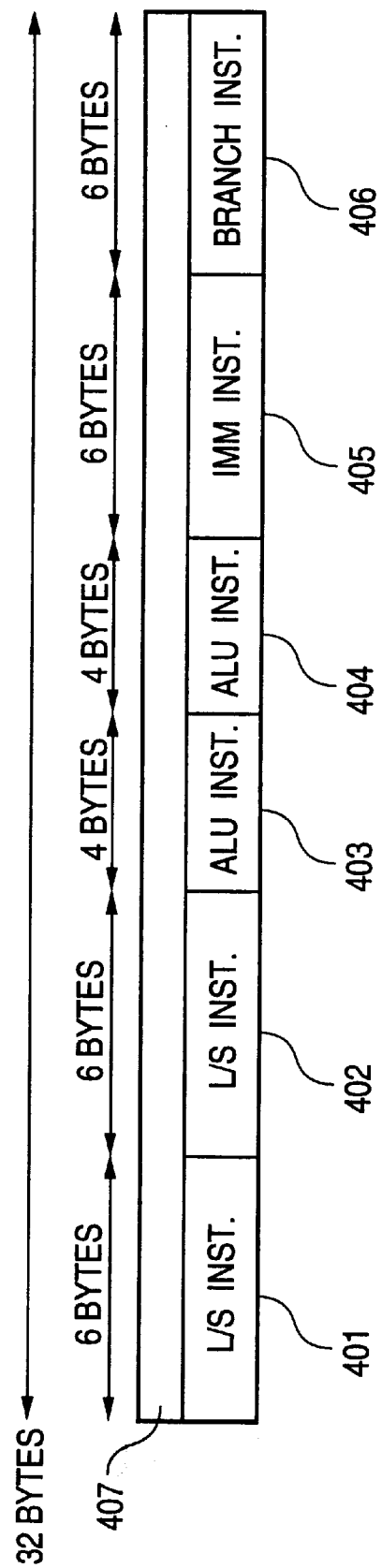
FIG. 1 illustrates an example of the format of the basic VLIW instruction.
Figure 2:
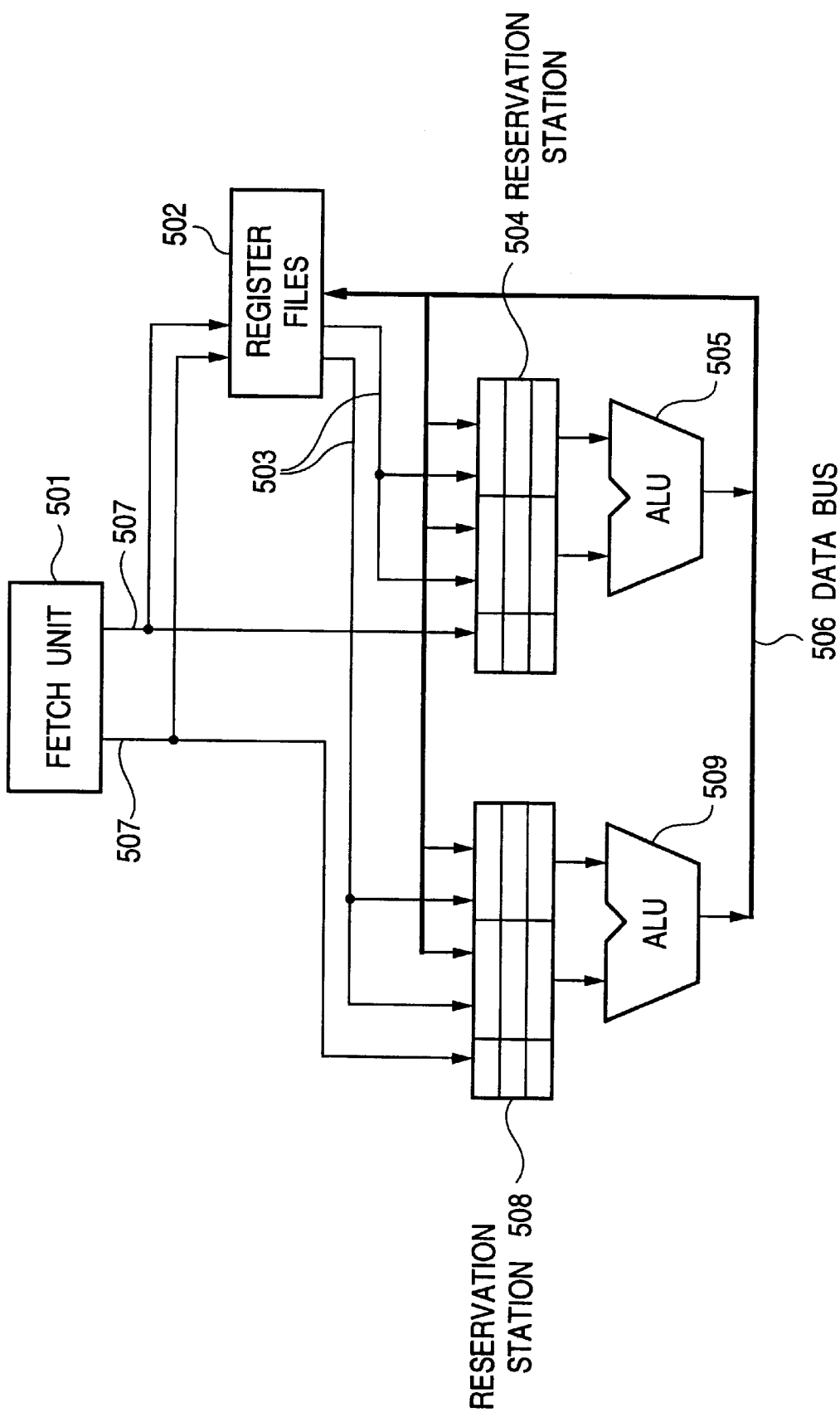
FIG. 2 is a block diagram illustrating one example of the advanced superscalar system.
Figure 3:
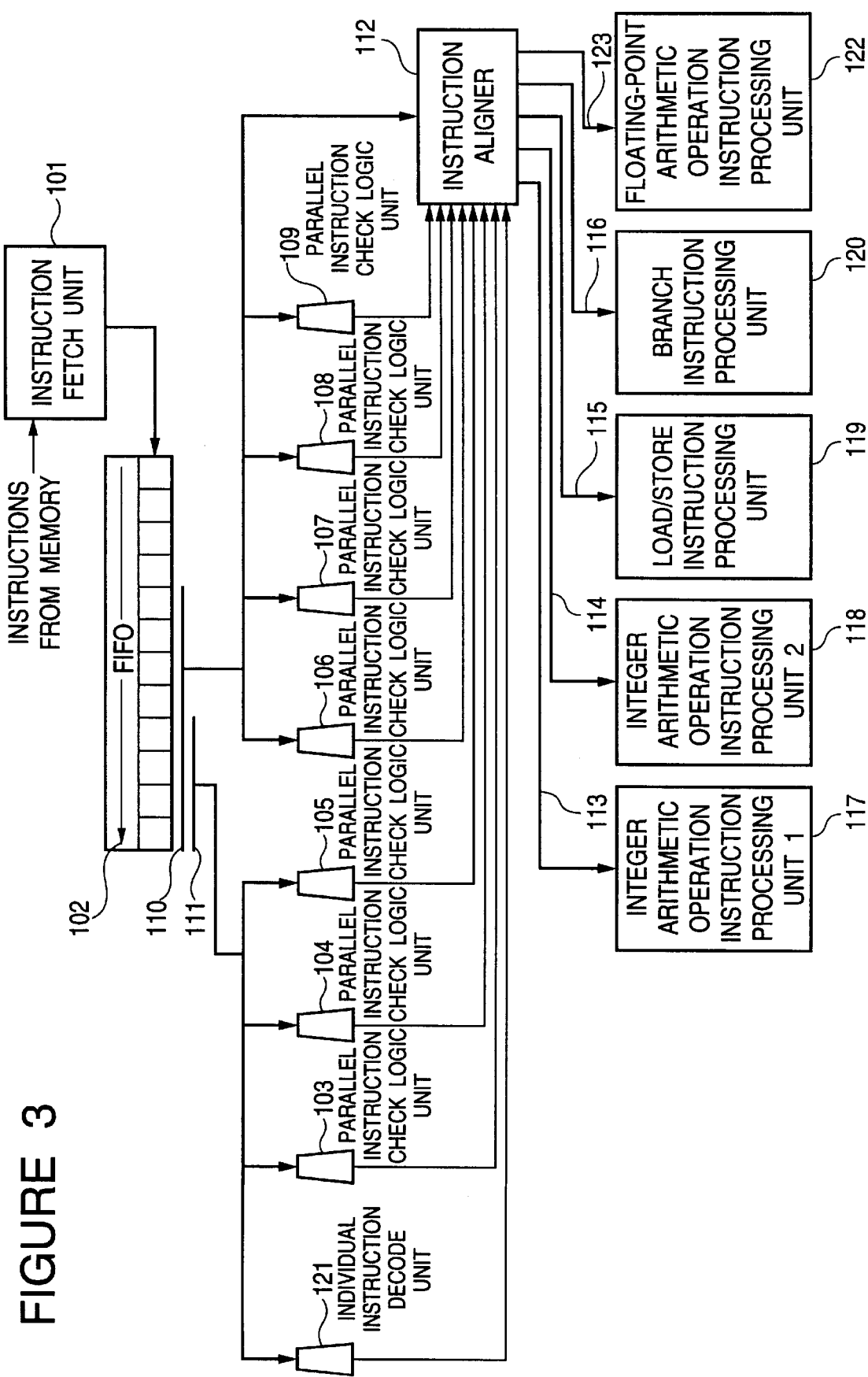
FIG. 3 is a block diagram of an embodiment of a template issue type processing system in accordance with the present invention.
Figure 4:
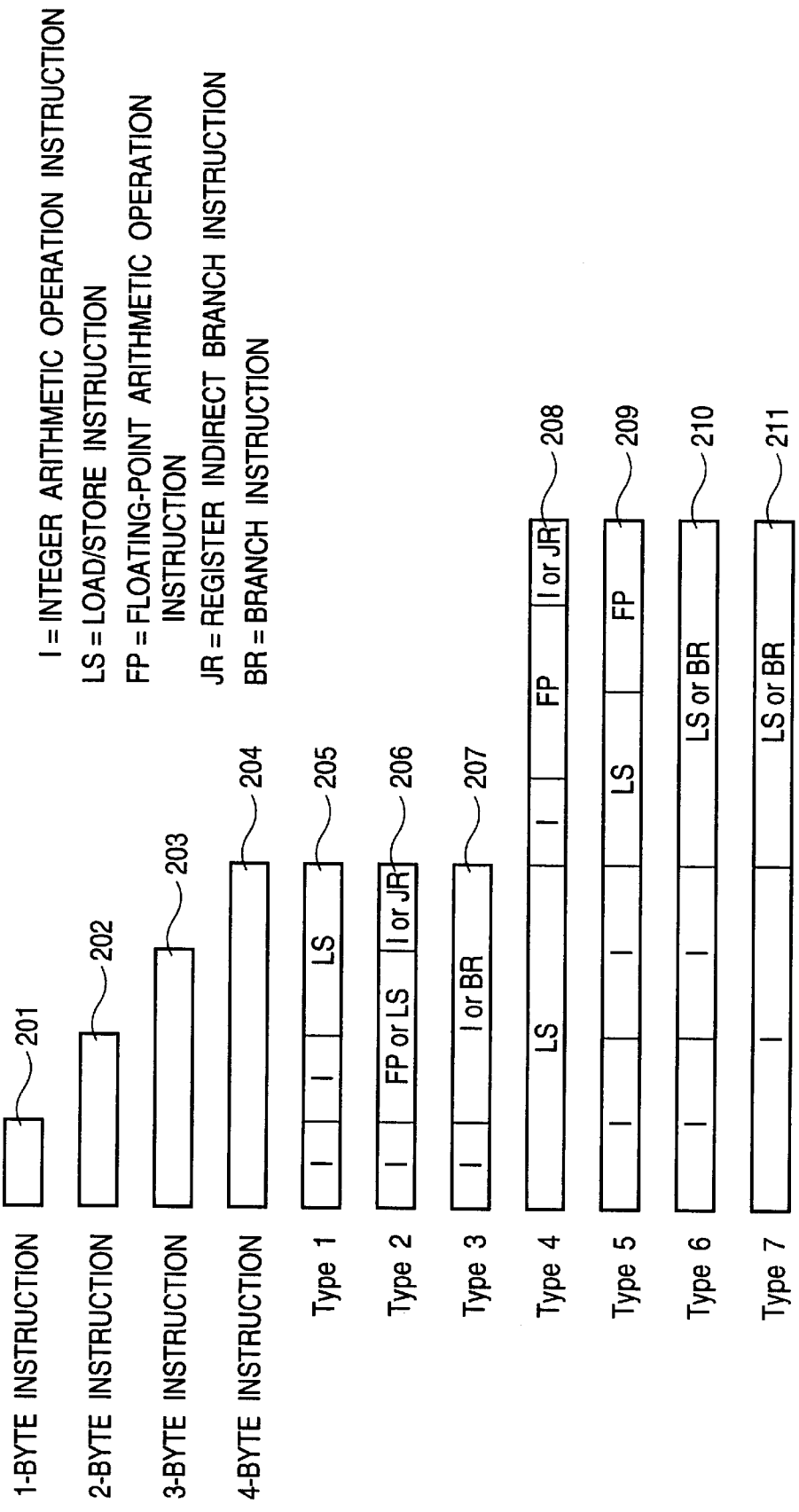
FIG. 4 illustrates typical formats of elementary instruction sets and parallel instruction sets.

Referring to FIG. 3, there is shown a block diagram of an embodiment of a template issue type processing system in accordance with the present invention. FIG. 4 illustrates different instruction sets 201 to 204 having different instruction lengths, and typical parallel instruction formats 205 to 211 in which a plurality of instructions are issued. Here, each of the instruction sets 201 to 204 will be called hereinafter an "elementary instruction set" which can no longer divided in an instruction set level architecture of a data processing system in accordance with the present invention. Accordingly, in the instruction set level architecture of the data processing system in accordance with the present invention, the elementary instruction set has an instruction length of any of one byte to four bytes, dependently upon the kind of instructions. Therefore, FIG. 4 illustrates to which of processing groups, each of instructions included in each elementary instruction set belongs. On the other hand, FIG. 5 illustrates the byte number of various elementary instructions.

The template issue type processing system shown in FIG. 3 comprises an instruction fetch unit 101 receiving a train of instructions to be executed, read out from a memory (not shown) and outputting the train of instructions to be executed, to a FIFO (first-in first-out register) 102. A 4-byte parallel output 111 of the FIFO 102 is coupled to an individual instruction decode unit 121, and three parallel instruction check logic units 103 to 105, in parallel to one another, and a 8-byte parallel output 110 of the FIF is coupled to four parallel instruction check logic units 106 to 109 and an instruction aligner 112, which also receives an output of each of the individual instruction decode unit 121 and the parallel instruction check logic units 103 to 109. Five outputs of the instruction aligner 112 are coupled to two integer arithmetic operation instruction processing units 117 and 118, a load/store instruction processing unit 119, a floating-point arithmetic operation instruction processing unit 122 and a branch instruction processing unit 120. Thus, the above mentioned processing groups are divided into five groups including an integer arithmetic operation instruction processing group, a load/store instruction processing group, a floating-point arithmetic operation instruction processing group, a branch instruction processing group, and the other group. Furthermore, all the elementary instruction set is subdivided in accordance with the classification of the instruction length and the classification of the unit for processing the instruction.

When a plurality of instructions are issued, it is necessary that fetched instructions are arranged in any of the formats "Type 1" to "Type 7" designated by Reference Numerals 205 to 211 in FIG. 4. Each of these formats will be called a "parallel instruction set" hereinafter. In this invention, the parallel instruction set is constructed to have a predetermined length by suitably and selectively combining the elementary instruction sets, and a restricted style in which the elementary instruction sets are arranged in the order determined for each of the processing groups. In this embodiment, seven different parallel instruction sets are defined as shown in FIG. 4.

The "Type 1" parallel instruction set 205 includes an integer arithmetic operation instruction of one byte, an integer arithmetic operation instruction of one byte, and a load/store instruction of two bytes, which are arranged or strung in the named order. The "Type 2" parallel instruction set 206 includes an integer arithmetic operation instruction of one byte, a floating-point arithmetic operation instruction or a load/store instruction of two bytes, and an integer arithmetic operation instruction or a register indirect branch instruction of one byte, which are arranged or strung in the named order. The "Type 3" parallel instruction set 207 includes an integer arithmetic operation instruction of one byte and an integer arithmetic operation instruction or a branch instruction of three bytes, which are arranged or strung in the named order. The "Type 4" parallel instruction set 208 includes a load/store instruction of four bytes, an integer arithmetic operation instruction of one byte, a floating-point arithmetic operation instruction of two bytes, and an integer arithmetic operation instruction or a register indirect branch instruction of one byte, which are arranged or strung in the named order. The "Type 5" parallel instruction set 209 includes an integer arithmetic operation instruction of two bytes, an integer arithmetic operation instruction of two bytes, a load/store instruction of two bytes, and a floating-point arithmetic operation instruction of two bytes, which are arranged or strung in the named order. The "Type 6" parallel instruction set 210 includes an integer arithmetic operation instruction of two bytes, an integer arithmetic operation instruction of two bytes, and a load/store instruction or a branch instruction of four bytes, which are arranged or strung in the named order. The "Type 7" parallel instruction set 211 includes an integer arithmetic operation instruction of four bytes, and a load/store instruction or a branch instruction of four bytes, which are arranged or strung in the named order. These formats "Type 1" to "Type 7" are the templates.

The above mentioned instruction sets executed in parallel have some number of templates, and a plurality of instructions are issued only when the instruction set matches with one of the templates. If a string of instructions does not match with any of the templates, the instructions are executed, one by one, in the order. This system will be called a "template type instruction issue" system. The block diagram shown in FIG. 3 shows a processing mechanism for performing this template type instruction issue.

The instruction fetch unit 101 receives a string of instructions, and the string of instructions to be executed are supplied to the instruction FIFO 102 from a right side of the FIFO 102 in the order to be executed. The instructions held in the instruction FIFO 102 are removed from a left side of the instruction FIFO 102 in the order from the istructions whose issue processing has been completed, and the remaining instructions in the instruction FIFO 102 are shifted in a leftward direction by the amount of the instruction or instructions whose issue processing has been completed. The instructions held in the instruction FIFO 102 are maintained in such a relation that the nearer the instruction is to a left end of the instruction FIFO 102, the instruction should be executed earlier. An empty occurs in the instruction FIFO 102, a next, namely, new instruction or instructions are inserted into the instruction FIFO 102, of course from the right side region of the instruction FIFO 102.

Figure 6:
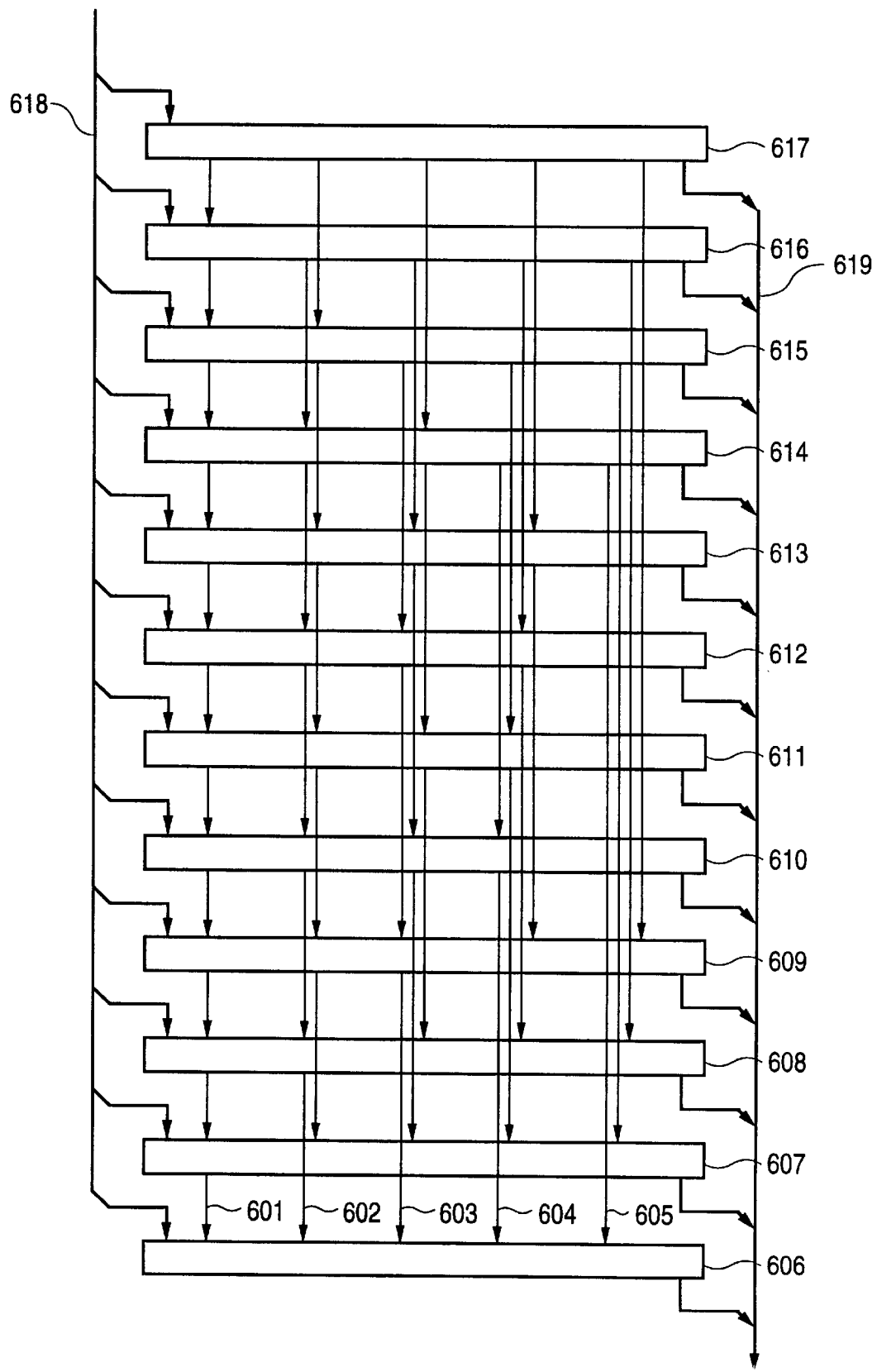
FIG. 6 illustrates a construction of the FIFO unit.

Referring to FIG. 6, a construction of the instruction FIFO 102 is illustrated. The instruction FIFO 102 includes 12 stages 606 to 617 each of which can hold one byte of instruction, and each of which is coupled to an input bus 618 connected to the instruction fetch unit 101 and an output bus 619. The stage 606 corresponds to the left end stage of the instruction FIFO 102, and the stage 617 corresponds to the right end stage of the instruction FIFO 102. When one byte of instructions as shown by "1-BYTE INSTRUCTION 201" in FIG. 4 is issued from the left end stage 606 through the output bus 619, the instructions held in the remaining stages 607 to 617 are shifted leftward by one stage as designated by Reference Numeral 601, and one byte of new instructions are fetched into the right end stage 617 from the instruction fetch unit 101. When two bytes of instructions as shown by "2-BYTE INSTRUCTION 202" in FIG. 4 are issued from the left end two stages 606 and 607 through the output bus 619, the instructions held in the remaining stages 608 to 617 are shifted leftward by two stages as designated by Reference Numeral 602, and two bytes of new instructions are fetched into the right end two stages 616 and 617 from the instruction fetch unit 101. Furthermore, when three bytes of instruction as shown by "3-BYTE INSTRUCTION 203" in FIG. 4 are issued from the left end three stages 606 and 608 through the output bus 619, the instructions held in the remaining stages 609 to 617 are shifted leftward by three stages as designated by Reference Numeral 603, and three bytes of new instructions are fetched into the right end three stages 615 to 617 from the instruction fetch unit 101. When four bytes of instructions as shown by "1-BYTE INSTRUCTION 204" in FIG. 4 are issued from the left end four stages 606 and 609 through the output bus 619, the instructions held in the remaining stages 610 to 617 are shifted leftward by four stages as designated by Reference Numeral 604, and four bytes of new instructions are fetched into the right end four stages 614 to 617 from the instruction fetch unit 101. When eight bytes of instruction are issued from the left end eight stages 606 and 613 through the output bus 619, the instructions held in the remaining stages 614 to 617 are shifted leftward by eight stages as designated by Reference Numeral 605, and eight bytes of new instructions are fetched into the right end eight stages 610 to 617 from the instruction fetch unit 101.

The left end four bytes 111 of the instruction FIFO 102 where the four bytes of instructions should be executed at the earliest situation, correspond to a four-byte size parallel instruction set in size, and are supplied to each of three parallel instruction check logic units 103, 104 and 105. The left end eight bytes 110 of the instruction FIFO 102 correspond to an eight-byte size parallel instruction set in size, and are supplied to each of four parallel instruction check logic units 106, 107, 108 and 109. The parallel instruction check logic unit 103 is configured to detect the "Type 1" parallel instruction set, and the parallel instruction check logic unit 104 is configured to detect the "Type 2" parallel instruction set. The parallel instruction check logic unit 105 is configured to detect the "Type 3" parallel instruction set. The parallel instruction check logic unit 106 is configured to detect the "Type 4" parallel instruction set, and the parallel instruction check logic unit 107 is configured to detect the "Type 5" parallel instruction set. The parallel instruction check logic unit 108 is configured to detect the "Type 6" parallel instruction set, and the parallel instruction check logic unit 109 is configured to detect the "Type 7" parallel instruction set.

Each of the parallel instruction check logic units discriminates whether or not the received bytes of instructions match with an instruction string to be detected by the parallel instruction check logic unit, and outputs a signal indicative of a "truth" to the instruction aligner 112 when the received bytes of instructions are arranged to comply with the above mentioned restriction.

Figure 7:
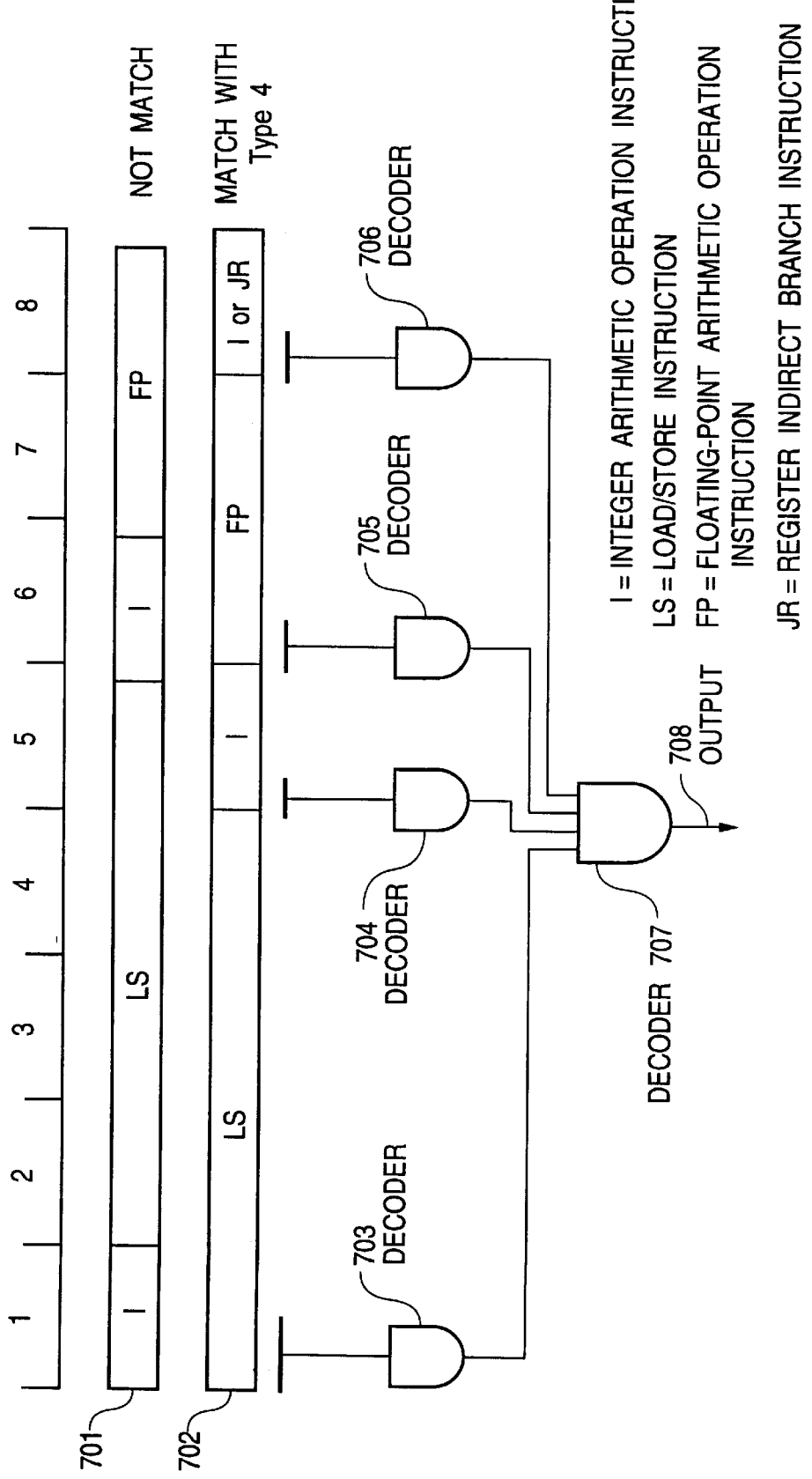
FIG. 7 is an internal logic diagram of one of the parallel instruction check logic units in the system shown in FIG. 3.

Referring to FIG. 7, there is shown a logic diagram of the parallel instruction check logic unit 106 configured to detect the "Type 4" parallel instruction set. The left side eight bytes of instructions are supplied from the instruction FIFO 102 to the parallel instruction check logic unit 106, and the parallel instruction check logic unit 106 includes logic circuits 703 and 706 which function as a decoder. The decoder 703 receives only a head end portion of a four-byte instruction starting from a first byte, and outputs a signal indicative of a "truth" when it receives a four-byte load/store instruction, and a signal indicative of a "false" in the other cases. The decoder 704 receives only a head end portion of a one-byte instruction starting from a fifth byte, and outputs a signal indicative of a "truth" when it receives a one-byte integer arithmetic operation instruction starting from the fifth byte, and a signal indicative of a "false" in the other cases. The decoder 705 receives only a head end portion of a two-byte instruction starting from a sixth byte, and outputs a signal indicative of a "truth" when it receives a two-byte floating-point arithmetic operation instruction starting from the sixth byte, and a signal indicative of a "false" in the other cases. The decoder 706 receives only a head end portion of a one-byte instruction starting from an eighth byte, and outputs a signal indicative of a "truth" when it receives a one-byte register indirect branch operation instruction or a one-byte integer arithmetic operation instruction, starting from the eighth byte, and a signal indicative of a "false" in the other cases. An output of each of these decoders 703 to 706 is supplied to an AND gate 707, which outputs a signal 708 indicative of a "truth" when all the decoders 703 to 706 output the signal 708 indicative of the "truth".

In FIG. 7, Reference Numeral 701 shows a string of instructions which does not match with the "Type 4" parallel instruction set, and Reference Numeral 702 shows a string of instructions which match with the "Type 4" parallel instruction set. When the instruction string 701 is received, since a first byte of instructions is not the load/store instruction, the decoder 703 outputs the signal indicative of the "false". The decoders 704 and 706 decode a middle portion of an instruction, and therefore, cannot obtain a proper decoded result. Namely, in many cases, each of the decoders 704 and 706 outputs the signal indicative of the "false", but may rarely output the signal indicative of the "truth" depending upon an operand. However, since the decoder 703 outputs the signal indicative of the "false", the AND gate 707 outputs the signal indicative of the "false". On the other hand, when the format 702 is received, since all the decoders 703 to 706 output the signal indicative of the "truth", the AND gate 707 outputs the signal 708 indicative of the "truth".

In the system shown in FIG. 3, if any one of the parallel instruction check logic units 103 to 109 outputs the signal indicative of the "truth", the instructions held in the FIFO 102 are issued as the parallel instruction set, and if none of the parallel instruction check logic units 103 to 109 outputs the signal indicative of the "truth", the instructions held in the FIFO 102 are processed one by one. The individual instruction decode unit 121 decodes one byte of instructions at the leftmost of the instruction FIFO 102, so as to determine the size of the instruction and the processing group which should process the received instruction. The size of the instruction and the processing group determined by the individual instruction decode unit 121 are supplied to the instruction aligner 112.

Figure 8:
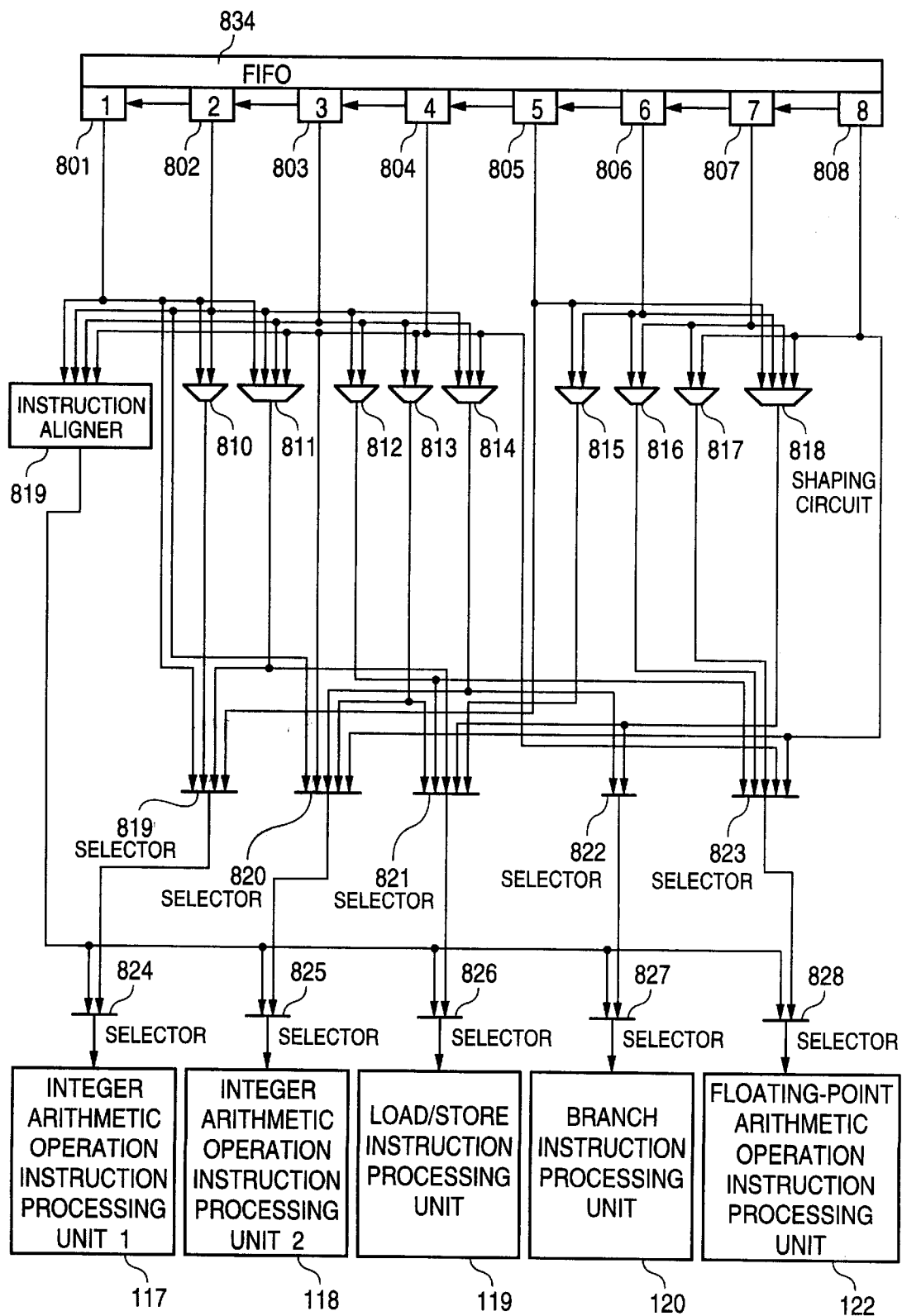
FIG. 8 is a block diagram of an instruction aligner incorporated in the system shown in FIG. 3.

Referring to FIG. 8, there is shown a block diagram of the instruction aligner 112. The instruction aligner 112 in this embodiment is extremely simpler than an instruction aligner configured to process all instruction strings, since the instruction aligner 112 is sufficient if it has a network capable of re-arranging only the seven kinds of instruction strings.

In FIG. 8, Reference Numeral 834 designates leftmost eight bytes of the instruction FIFO 102 shown in FIG. 3, which correspond to eight bytes, which should be firstly issued, of instructions held in the instruction FIFO 102. An instruction aligner 809 is one which is used when the instructions matches with none of the templates. The individual instruction decode unit 121 decodes the size of the instruction, and on the basis of the obtained size of the instruction, the instruction aligner 809 executes an alignment processing. Therefore, since only one instruction is decoded, the instruction aligner 809 can be realized similarly to a conventional one for the prior art pipeline system.

In FIG. 8, Reference Numerals 810 to 818 designate shaping circuits each of which receives predetermined bytes of the instruction FIFO 834 and shapes the received bytes into a predetermined format. Reference Numerals 819 to 823 designate selectors each of which receives a predetermined byte or bytes of the instruction FIFO 834 and an output of selected ones of the shaping circuits 810 to 818, for selecting an instruction to be issued or supplied to a corresponding processing unit when a plurality of instructions are issued or supplied. Therefore, the selectors 819 to 823 correspond to the processing units 117, 118, 119, 120 and 122, respectively. Reference Numerals 824 to 828 also designate selectors which correspond to the selectors 819 to 823, respectively, and also correspond to the processing units 117, 118, 119, 120 and 122, respectively, and which select and supply the output of the selectors 819 to 823 to the processing units 117, 118, 119, 120 and 122, respectively, when a plurality of instructions are issued or supplied. When a plurality of instructions are not issued or supplied, namely, when the instructions are to be processed as individual instructions, the selectors 824 to 828 supply an output of the instruction aligner 809 to the corresponding processing units 117, 118, 119, 120 and 122, respectively.

More specifically, the shaping circuit 810 shapes the two-byte instruction. As seen from FIG. 4, if the received instructions match with any of the templates, only the two-byte integer arithmetic operation instruction appears on the first byte and the second byte of the instructions. Therefore, the output of the shaping circuit 810 is connected to the selector 819 for selecting the instruction to be supplied to the integer arithmetic operation processing unit 1, 117. The selector 819 supplies the output of the shaping circuit 810 to the integer arithmetic operation processing unit 1, 117, for the processing which should be executed when the "Type 5" or "Type 6" parallel instruction set is detected by the corresponding parallel instruction check logic unit.

Furthermore, the shaping circuit 811 shapes the four-byte instruction on the first to fourth bytes of the FIFO 834, and is used when the "Type 4" or "Type 7" parallel instruction set is detected. In the "Type 4" parallel instruction set, since the four-byte instruction on the first to fourth bytes of the FIFO 834 is the load/store instruction, an output of the shaping circuit 811 is connected to the selector 821 so as to supplied to the load/store instruction processing unit 119. On the other hand, In the "Type 7" parallel instruction set, the output of the shaping circuit 811 is connected to the selector 819 so as to supplied to the integer arithmetic operation processing unit 1, 117.

In addition, the shaping circuit 812 shapes the two-byte floating-point arithmetic operation instruction or two-byte load/store instruction on the second and third fourth bytes of the FIFO 834 when the "Type 2" parallel instruction set is detected. The shaping circuit 813 shapes the two-byte integer arithmetic operation instruction of the "Type 5" or "Type 6" parallel instruction set, or the two-byte load/store instruction of the "Type 1" parallel instruction set. The shaping circuit 814 shapes the three-byte floating-point integer operation instruction or three-byte branch instruction of the "Type 3" parallel instruction set. The shaping circuit 815 shapes the two-byte load/store operation instruction of the "Type 5" parallel instruction set. The shaping circuit 816 shapes the two-byte floating-point integer operation instruction of the "Type 4" parallel instruction set. The shaping circuit 817 shapes the two-byte floating-point integer operation instruction of the "Type 5" parallel instruction set. The shaping circuit 818 shapes the four-byte load/store instruction or the four-byte branch instruction of the "Type 6" or "Type 7" parallel instruction set.

Each instruction group shaped in format is selected by the selectors 819 to 823 in accordance with the type, and supplied to a corresponding one of the processing units 117 to 120 and 122. Here, since the instruction string issued or supplied is determined by considering the processing units provided in the system, the instruction string detected by each parallel instruction check logic unit can be unconditionally issued or supplied to the corresponding processing unit As seen from the above, in the instruction processing system of the shown embodiment, even if the clock frequency becomes high, it is possible to increase the number of instructions issued or supplied simultaneously in parallel, in the data processing system having the variable length instruction set. As shown in FIG. 7, in the case of the variable length instruction set, if only bits to which attention is to be paid are decoded, a similar advantage can be obtained to the case in which all the instructions are decoded in the order from a first bit, and in addition, it is no longer necessary to detect a partition or boundary between adjacent instructions.

Considering the example shown in FIG. 7, only a delay corresponding to the AND gate 707 is increased for the decoding of each one instruction. Furthermore, as seen from FIG. 8, the instruction aligning unit becomes simpler than a conventional complete cross-bar type. In the data processing system having the variable length instruction set, if a complete object type instruction issue system is adopted, the system of the present invention makes it possible to issue or supply an increased number of instructions in parallel under the same condition, since the system of the present invention can remove the restriction that the variable length instruction must be decoded in the order from a heading end.

As seen from the above, the present invention does not analyze all the instructions, but makes a limited number of combinations of instructions which frequently appear in an actual program, as a limited number of instruction templates, and prepares, in decoder circuits, a function of checking whether or not the received instruction string matches with any one of the instruction templates. When the received instruction string matches with any one of the instruction templates, a plurality of instructions are issued or supplied to the corresponding processing units, simultaneously in parallel. On the other hand, when the received instruction string matches with none of the instruction templates, the instructions are processed in the conventional manner. In this case, if the received instruction string matches with none of the instruction templates, a plurality of instructions of the instructions fetched in the instruction fetch mechanism can be issued by utilizing a superscalar type plural instruction decoding logic using the elementary instruction set. Thus, a high performance instruction processing can be realized. In addition, since a plurality of variable length instructions are combined to generate a fixed length instruction set, it is possible to simplify an overall instruction fetch mechanism.

The invention has thus been shown and described with reference to the specific embodiments. However, it should be noted that the present invention is in no way limited to the details of the illustrated structures but changes and modifications may be made within the scope of the appended claims.

What is claimed is:

1. An instruction processing method for decoding fetched instructions in parallel within a template-type instruction processing system which includes a variable length instruction set, comprising the steps of:

defining a set of elementary instructions, each of which embodies a minimum length instruction which can no longer be divided in an instruction set level architecture of a data processing system;

defining a set of parallel instructions, each of which embodies a different combination of two or more elementary instructions which can be processed in parallel;

fetching, in an instruction fetch mechanism, an instruction string to be executed from an instruction store and transfer means, the fetched instruction string comprising at least one of the elementary instructions or the parallel instructions;

comparing the fetched instruction string to the set of parallel instructions in order to determine whether a set of instructions in the fetched instruction string matches any of the parallel instructions in the set of parallel instructions;

when a set of instructions in the fetched instruction string matches any one of the parallel instructions in the set of parallel instructions, issuing each of the elementary instructions in the matched set of instructions of the fetched instruction string to a corresponding processing unit, and processing each of the elementary instructions in the matched set of instructions in parallel in the processing units; and when a set of instructions in the fetched instruction string do not match any one of the parallel instructions in the set of parallel instructions, individually executing the elementary instructions in the fetched instruction string in the order in which they are received from the fetch mechanism.

2. An instruction processing method as claimed in claim 1, wherein the step of defining the set of parallel instructions comprises, for each parallel instruction, arranging a plurality of elementary instructions in a predetermined order to a predetermined length.

3. An instruction processing method as claimed in claim 1, wherein the step of defining the set of parallel instructions comprises, for each parallel instruction, arranging a plurality of elementary instructions in a predetermined order to a predetermined length which is an integer multiple of a word length inherent to said instruction processing system.

4. An instruction processing method as claimed in claim 1, wherein when the instruction string fetched in the instruction fetch mechanism matches with none of the parallel instructions, further including a step of issuing a plurality of the instructions fetched in the instruction fetch mechanism by utilizing superscaler type plural instruction decoding logic using the set of elementary instructions.

5. An instruction processing method as claimed in claim 1, wherein the step of defining includes classifying said set of elementary instructions into a plurality of groups of elementary instructions in accordance with different processing units for processing a given instruction, and an instruction field, wherein only instructions belonging to any of said plurality of groups can be located is defined as a slot, and wherein the set of parallel instructions is prepared by arranging said slot of some number.

6. An instruction processing method as claimed in claim 5, wherein said step of defining said set of parallel instructions includes arranging said slots in a predetermined order to a predetermined length which is an integer multiple of a word length inherent to said instruction processing system.

7. An instruction processing method as claimed in claim 6, further including a step of classifying said set of elementary instructions into a plurality of groups of elementary instructions in accordance with different processing units for processing a given elementary instruction, and in accordance with the length of the elementary instruction.

8. An instruction processing method as claimed in claim 7, wherein said step of defining the set of parallel instructions includes arranging said slots in a predetermined order, and the elementary instruction included in a plurality of said slots which constitute a single parallel instruction is individually processed without exception.

9. An instruction processing method as claimed in claim 1, wherein the step of comparing includes generating a true signal to indicate that a fetched instruction string includes a set of instructions which matches with one parallel instruction of the set of parallel instructions, and a false signal to indicate that no match is found.

10. An instruction processing method as claimed in claim 9, wherein if all false signals issue for all parallel instructions of the set of parallel instructions during the step of comparing, then each instruction in the fetched instruction string is processed in sequence in the order which it is received.

11. An instruction processing method as claimed in claim 1, further including a step of decoding individual instructions within the fetched instruction string to determine the size of each instruction, and the step of fetching utilizes an instruction store and transfer means.

12. An instruction processing method as claimed in claim 1, further including a step of aligning individual instructions within the fetched instruction string by size.

13. A template-type instruction processing system having a variable length instruction set for decoding fetched instructions in parallel, wherein a set of instructions, each of which can no longer be divided in an instruction set level architecture of a data processing system, is defined as a set of elementary instructions, comprising:

means for defining a set of parallel instructions, each of which embodies a different combination of two or more elementary instructions which can be processed in parallel;

an instruction fetch means for fetching a string of instructions;

means for matching a string of instructions fetched in the instruction fetch means with each of the plurality of parallel instructions;

means for issuing each of the elementary instructions in the matched set of instructions of the fetched instruction string to a corresponding processing unit when a set of instructions in the fetched instruction string matches any one of the parallel instructions in the set of parallel instructions, and processing each of the elementary instruction in the matched set of instructions in parallel in the processing units; and means for individually executing the elementary instructions in the fetched instruction string in the order in which they are received from the fetch mechanism when a set of instructions in the fetched instruction string do not match any one of the parallel instructions in the set of parallel instructions.

14. An instruction processing system having a variable length instruction set for decoding fetched instructions in parallel, comprising:

an instruction fetch means for fetching a string of instructions and for outputting the instructions in the order of fetching;

a first in-first out instruction store and transfer means having an input bus for receiving instructions outputted from said instruction fetch means, and an output bus for outputting the received instructions in the order in which they are received;

a plurality of parallel instruction checking means, coupled to said instruction store and transfer means, each for checking whether or not the instructions held in said instruction store and transfer means matches with a different predetermined instruction set format;

a plurality of instruction executing means, each for receiving and executing a given instruction outputted from said instruction store and transfer means;

an instruction distributing and aligning means, for receiving instructions from said instruction store and transfer means, for shaping the received instructions into a predetermined format as shaped instructions, and for outputting the shaped instructions to said plurality of instruction executing means;

wherein when one of said parallel instruction checking means detects that the instructions held in said instruction store and transfer means matches with a predetermined instruction set format, said one parallel instruction checking means outputs a true signal indicative that a match is found which is supplied to said instruction distributing and aligning means, which controls said plurality of instruction executing means so that a plurality of instructions are transferred to and executed simultaneously in parallel by said plurality of instruction executing means;

wherein when none of said parallel instruction checking means detects that the instructions held in said instruction store and transfer means matches with a predetermined instruction set format, all of said parallel instruction checking means output a false signal indicative that no match is found, which false signal is supplied to said instruction distributing and aligning means, which controls said plurality of instruction executing means so that the instructions in said instruction store and transfer means are executed one by one in the order they are received by said plurality of instruction executing means.

15. An instruction processing system as claimed in claim 14, wherein when none of said parallel instruction checking means detects that the instructions held in said instruction store and transfer means matches with a predetermined instruction set format, instructions are fetched from said instruction store and transfer means and are processed in the order in which they are received by supplying each instruction to a corresponding one of said plurality of instruction executing means.

16. An instruction processing system as claimed in claim 14, wherein an instruction which can no longer be divided in an instruction set level architecture of a data processing system is defined as an elementary instruction, and a combination of a number of elementary instructions, in a predetermined order, to a predetermined length, is defined as a parallel instruction, and wherein said instruction distributing and aligning means includes a means for analyzing a parallel instruction and a means for analyzing an elementary instruction.

17. The instruction processing system claimed in claim 14, further comprising:

a memory means, wherein the instruction fetch means fetches the instruction string from the memory means to the instruction store and transfer means, the instruction store and transfer means includes a four-byte and an eight-byte parallel output port, wherein the four-byte output port is connected to an individual instruction decode unit, and first, second and third parallel instruction check logic units, and the eight-byte output port is connected to fourth, fifth, sixth and seventh parallel instruction check logic units;

the instruction distributing and aligning means includes at least first through nine input ports and at least five output ports, the first input port connected to the individual instruction decode unit, the ninth input port connected to the eight-byte parallel output port, and the second to eighth input ports connected to said first through seventh parallel instruction check logic units, respectively; and said plurality of instruction executing means includes first and second integer arithmetic operation instruction processing units, a load/store instruction processing unit, a branch instruction processing unit, and a floating point arithmetic operation instruction processing unit.

* * * * *